(12) United States Patent
Su et al.

(10) Patent No.: US 11,662,817 B2
(45) Date of Patent: May 30, 2023

(54) METHOD FOR CONTROLLING GIMBAL BY SOMATOSENSORY CONTROLLER, GIMBAL, SOMATOSENSORY CONTROLLER, AND SYSTEM

(71) Applicant: SZ DJI TECHNOLOGY CO., LTD., Shenzhen (CN)

(72) Inventors: Tie Su, Shenzhen (CN); Yi Hao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 364 days.

(21) Appl. No.: 16/902,793

(22) Filed: Jun. 16, 2020

(65) Prior Publication Data

US 2020/0310542 A1     Oct. 1, 2020

Related U.S. Application Data

(63) Continuation of application No. PCT/CN2017/118085, filed on Dec. 22, 2017.

(51) Int. Cl.
| | |
|---|---|
| *G06F 3/01* | (2006.01) |
| *G01C 17/38* | (2006.01) |
| *G01C 19/00* | (2013.01) |
| *G01P 15/08* | (2006.01) |
| *G05B 15/02* | (2006.01) |
| *G05D 3/12* | (2006.01) |

(52) U.S. Cl.
CPC .............. *G06F 3/015* (2013.01); *G01C 17/38* (2013.01); *G01C 19/00* (2013.01); *G01P 15/08* (2013.01); *G05B 15/02* (2013.01); *G05D 3/12* (2013.01)

(58) Field of Classification Search
CPC ......... G06F 3/015; G01C 17/38; G01C 19/00; G01P 15/08; G05B 15/02; G05D 3/12
USPC ......................................................... 700/275
See application file for complete search history.

(56) References Cited

U.S. PATENT DOCUMENTS

| | | | |
|---|---|---|---|
| 8,818,571 B1 | 8/2014 | Iida et al. | |
| 9,589,476 B2 * | 3/2017 | Zhang | .................. G05D 1/0022 |
| 11,275,390 B2 * | 3/2022 | Zheng | ..................... G06F 21/32 |
| 11,327,477 B2 * | 5/2022 | Zheng | ..................... G05D 1/101 |
| 2014/0277836 A1 | 9/2014 | Iida et al. | |

FOREIGN PATENT DOCUMENTS

| | | |
|---|---|---|
| CN | 101514900 A | 8/2009 |
| CN | 204883391 U | 12/2015 |
| CN | 105817030 A | 8/2016 |

(Continued)

OTHER PUBLICATIONS

The World Intellectual Property Organization (WIPO) International Search Report for PCT/CN2017/118085 dated Sep. 6, 2018 6 pages.

(Continued)

*Primary Examiner* — Aditya S Bhat
(74) *Attorney, Agent, or Firm* — Anova Law Group, PLLC

(57) ABSTRACT

A method of controlling a gimbal includes receiving angular velocity information transmitted by a somatosensory controller, the angular velocity information including an angular velocity of the somatosensory controller in a geodetic coordinate system, determining a target attitude of the gimbal according to the angular velocity information, and controlling the gimbal according to the target attitude.

18 Claims, 6 Drawing Sheets

(56) References Cited

FOREIGN PATENT DOCUMENTS

| CN | 106249745 A | 12/2016 |
| --- | --- | --- |
| CN | 205769822 U | 12/2016 |
| CN | 106325309 A | 1/2017 |
| CN | 206147348 U | 5/2017 |
| CN | 106959110 A | 7/2017 |
| CN | 107346141 A | 11/2017 |

OTHER PUBLICATIONS

Meng Yu, "Research on the algorithm for calculating the flight attitude of the quadrotor UAV", Feb. 27, 2017, p. 15-34, abstract only.

Xiangwei Qiao, et al., Study on Aerial Vehicle Attitude Estimation Based on Quaternion Particle Filter Algorithm, Acta Armamentarii, vol. 33, No. 9, Sep. 2012, abstract only.

Zengfeng Ye, et al., "Attitude Stabilization Based on Quaternion and Kalman Filter for Two-Wheeled Vehicle", Chinese Journal of Sensors and Actuators, vol. 25, No. 4, Apr. 2012, abstract only.

* cited by examiner

METHOD FOR CONTROLLING GIMBAL BY SOMATOSENSORY CONTROLLER, GIMBAL, SOMATOSENSORY CONTROLLER, AND SYSTEM

CROSS-REFERENCE TO RELATED APPLICATION

This application is a continuation of International Application No. PCT/CN2017/118085, filed Dec. 22, 2017, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the gimbal field and, more particularly, to a method for controlling a gimbal by a somatosensory controller, a gimbal, a somatosensory controller, and a system.

BACKGROUND

A user can conveniently control a gimbal by using a somatosensory controller to control the gimbal. However, in an existing solution of using the somatosensory controller to control the gimbal, the gimbal responses slowly and cannot follow an attitude change of the somatosensory controller, which impacts control efficiency.

Therefore, how to improve the control efficiency of using the somatosensory controller to control the gimbal has become an urgent technical problem to be solved.

SUMMARY

In accordance with the present disclosure, there is provided a method of a somatosensory controller controlling a gimbal. The method includes receiving angular velocity information transmitted by a somatosensory controller, the angular velocity information including an angular velocity of the somatosensory controller in a geodetic coordinate system, determining a target attitude of the gimbal according to the angular velocity information, and controlling the gimbal according to the target attitude.

In accordance with the present disclosure, there is provided a method of a somatosensory controller controlling a gimbal. The method includes obtaining angular velocity information, the angular velocity information including an angular velocity of a somatosensory controller in a geodetic coordinate system and transmitting the angular velocity information to the gimbal for controlling the gimbal according to the angular velocity information.

DETAILED DESCRIPTION OF THE EMBODIMENTS

Technical solutions of embodiments of the present disclosure are described in connection with accompanying drawings.

Specific examples of the present disclosure are merely used to help those skilled in the art to better understand embodiments of the present disclosure, but not to limit the scope of embodiments of the present disclosure.

In various embodiments of the present disclosure, a size of a sequence number of each process does not mean an execution order. The execution order of each process should be determined by its function and internal logic, and should not limit implementation processes of embodiments of the present disclosure.

Various embodiments described in the present disclosure may be implemented individually or in combinations, which are not limited by embodiments of the present disclosure.

Unless otherwise specified, all technical and scientific terms used in embodiments of the present disclosure have same meanings as commonly understood by those skilled in the art of the present disclosure. The terms used in the present disclosure are only to describe specific embodiments and are not intended to limit the scope of the present disclosure. The term "and/or" used in the present disclosure includes any and all combinations of one or more related listed items.

The technical solutions of embodiments of the present disclosure may be applied to various gimbals, e.g., a handheld gimbal, which is not limited by embodiments of the present disclosure. For example, the gimbal may also be arranged at a moving device. The moving device may be an unmanned aerial vehicle (UAV), an unmanned ship, an autonomous vehicle, a robot, etc., which is not limited by embodiments of the present disclosure.

Figure 1:
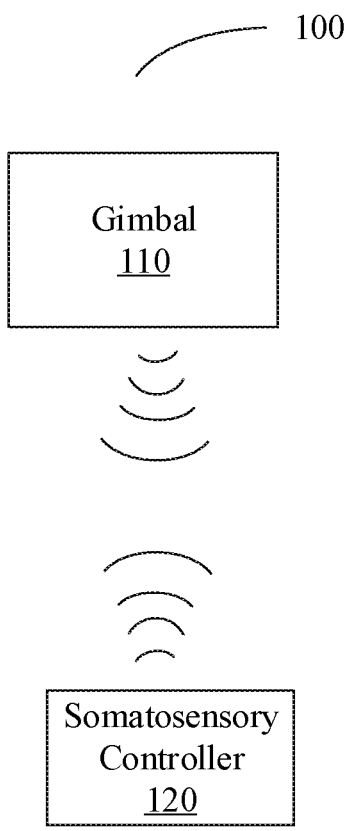
FIG. 1 illustrates a schematic diagram of a system according to some embodiments of the present disclosure.

FIG. 1 illustrates a schematic diagram of a system 100 according to some embodiments of the present disclosure.

As shown in FIG. 1, the system 100 includes a gimbal 110 and a somatosensory controller 120. The gimbal 110 and the somatosensory controller 120 may communicate with each other through a communicative connection. For example, the somatosensory controller 120 transmits information to the gimbal 110 through the communicative connection to control the gimbal 110. The communicative connection between the gimbal 110 and the somatosensory controller 120 may include a wireless communicative connection, which is not limited by embodiments of the present disclosure.

Figure 2:
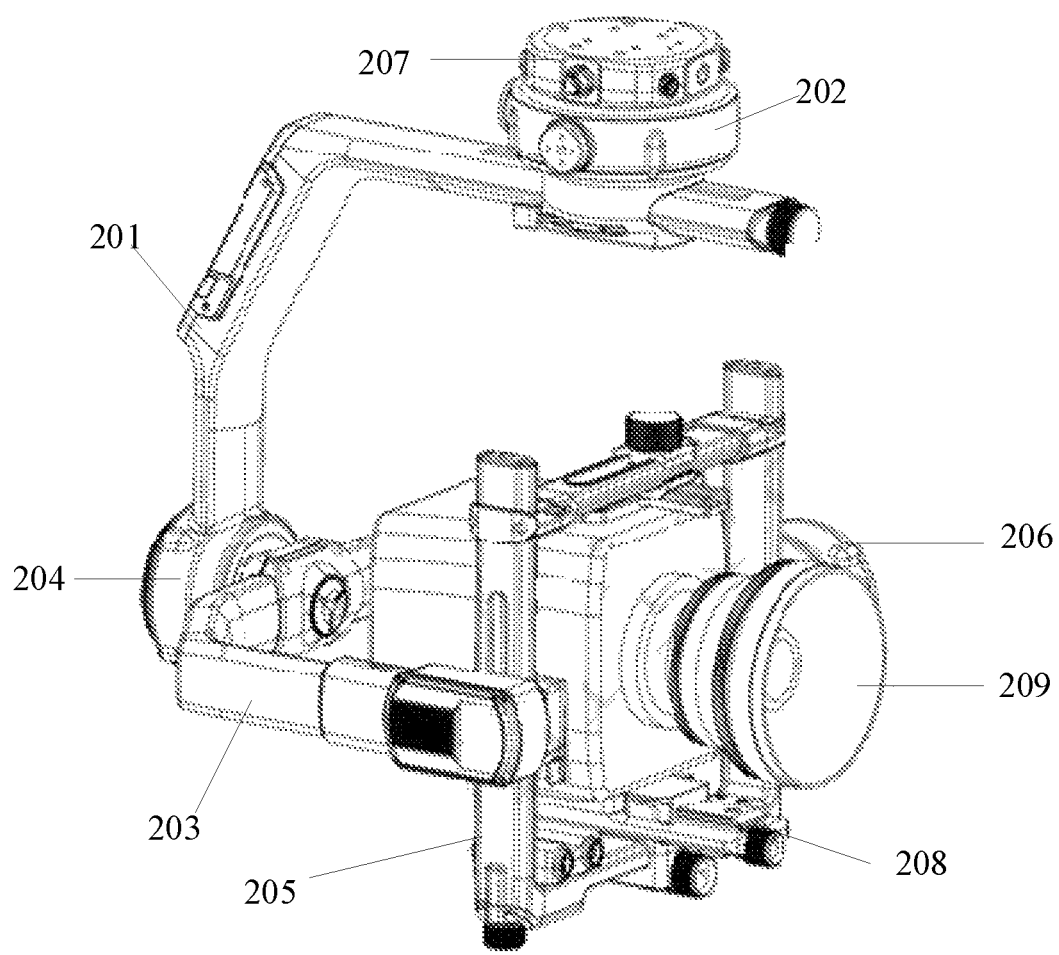
FIG. 2 illustrates a schematic diagram of a gimbal according to some embodiments of the present disclosure.

FIG. 2 illustrates a schematic diagram of a gimbal according to some embodiments of the present disclosure. FIG. 2 is merely exemplary and does not limit embodiments of the present disclosure.

As shown in FIG. 2, the gimbal includes a yaw axis arm 201, a yaw axis electric motor 202, a roll axis arm 203, a roll axis electric motor 204, a pitch axis arm 205, and a pitch axis electric motor 206, which form a rotation mechanism of the gimbal. Each electric motor can be controlled by a corresponding electronic speed control (ESC). The yaw axis arm 201 and the yaw axis electric motor 202 form a yaw-axis-rotation-axis mechanism, which is configured to effect the rotation about the yaw axis. The roll axis arm 203 and the roll axis electric motor 204 form a roll-axis-rotation-axis mechanism, which is configured to effect the rotation about the roll axis. The pitch axis arm 205 and the pitch axis electric motor 206 form a pitch-axis-rotation-axis mechanism, which is configured to effect the rotation about the pitch axis. The gimbal further includes a base 207 and a camera fixing mechanism 208. The camera fixing mechanism 208 is configured to fix the camera 209.

In some embodiments, the gimbal may further include a controller (not shown in FIG. 2), which is configured to control an attitude of the gimbal. The controller may be arranged in the camera fixing mechanism 208, or at other positions of the gimbal, which is not limited by embodiments of the present disclosure.

In some embodiments, the gimbal is provided with an inertial measurement unit (IMU), e.g., a gyroscope and/or an accelerometer. The controller may determine an actual attitude of the gimbal according to measurement data of the IMU and control rotation axes of the gimbal to rotate, such that the actual attitude of the gimbal reaches a target attitude.

In some embodiments, the gimbal is provided with a communication device, e.g., a receiver. The gimbal can receive information of the somatosensory controller through the receiver. The controller of the gimbal can determine the target attitude according to the information of the somatosensory controller to control the rotation axes of the gimbal to rotate. As such, the actual attitude of the gimbal reaches the target attitude.

Figure 3:
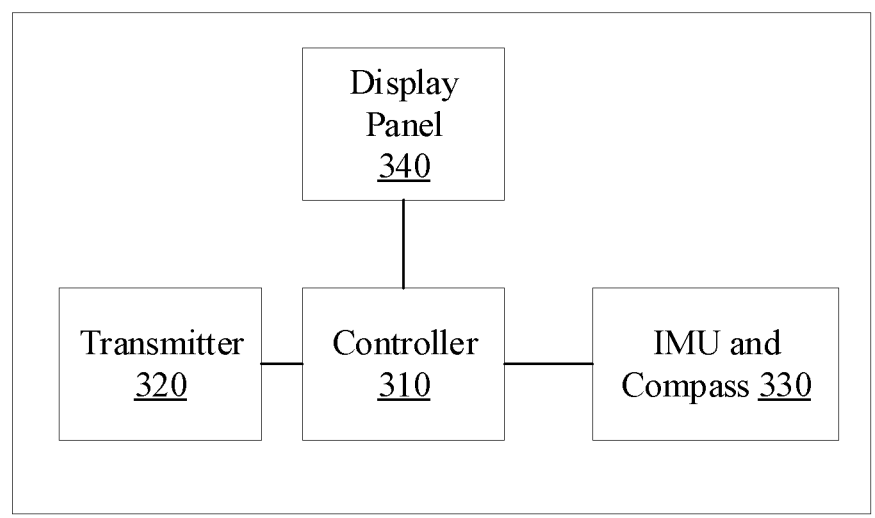
FIG. 3 illustrates a schematic diagram of a somatosensory controller according to some embodiments of the present disclosure.

FIG. 3 illustrates a schematic diagram of a somatosensory controller according to some embodiments of the present disclosure.

As shown in FIG. 3, the somatosensory controller includes a controller 310, a transmitter 320, an IMU and compass 330, and a display panel 340.

The display panel 340 may be a liquid crystal panel, which is configured to display information of the somatosensory controller and/or the gimbal. For example, the display panel 340 may display status, attitude information, velocity information, and control mode of the somatosensory controller, gimbal status information, etc., which are not limited by embodiments of the present disclosure.

The transmitter 320 may be a wireless transmitter and is configured to transmit the information of the somatosensory controller to the gimbal.

The IMU and compass 330 are sensors of the somatosensory controller and can measure the attitude information and the velocity information of the somatosensory controller.

The controller 310 is configured to obtain measurement data of the IMU and compass 330, determine the attitude information and velocity information of the somatosensory controller, drive the display panel to display related information, and transmit the related information to the gimbal through the transmitter 320.

In embodiments of the present disclosure, the "velocity" can include an "angular velocity."

In some embodiments, the somatosensory controller may further include a setting panel, which is configured for the user to enter corresponding settings. The controller 310 may perform corresponding control according to the settings of the user. The transmitter 320 may also transmit corresponding setting information to the gimbal.

Figure 4:
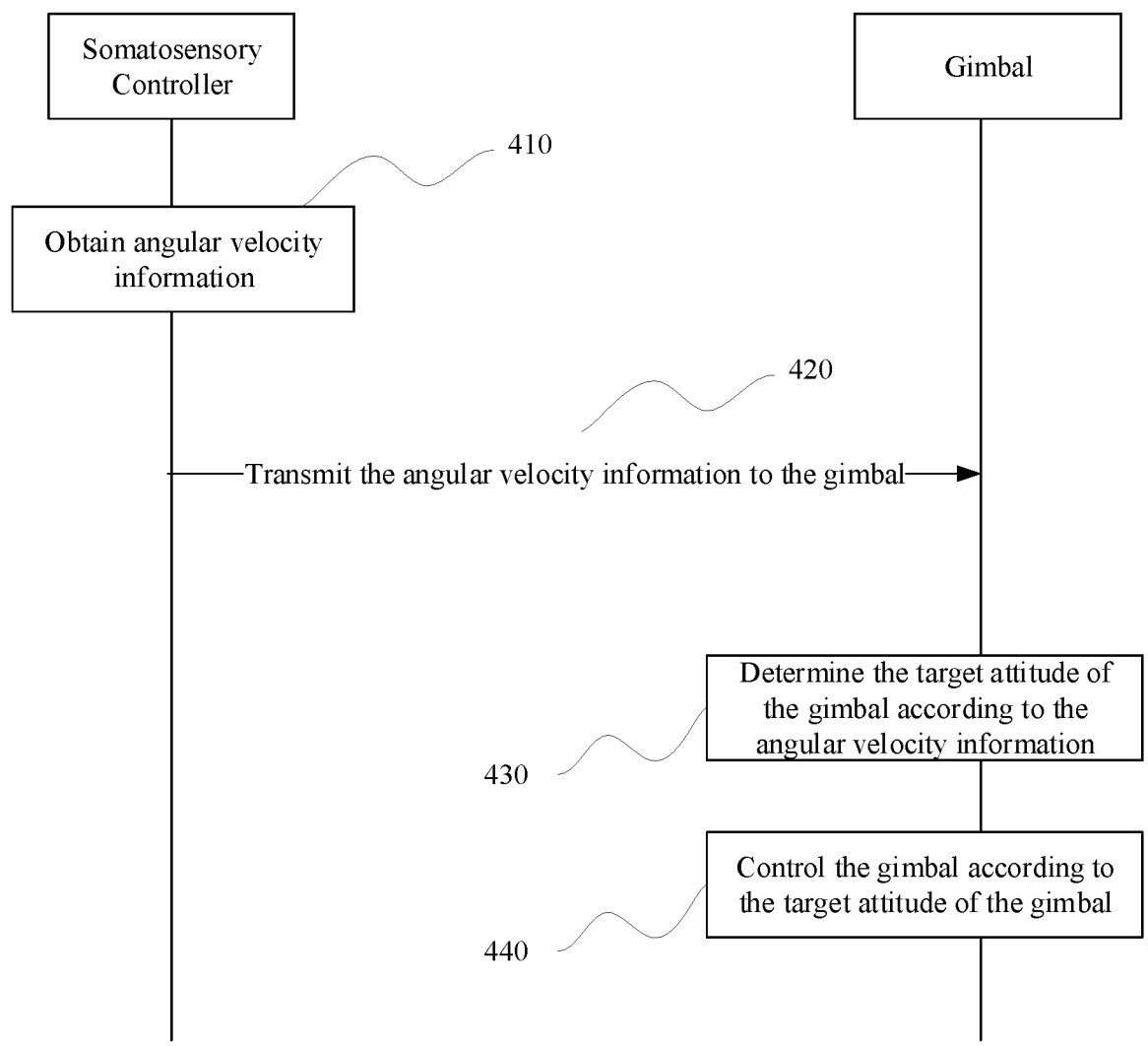
FIG. 4 illustrates a schematic flowchart of a method of controlling a gimbal by a somatosensory controller according to some embodiments of the present disclosure.

FIG. 4 illustrates a schematic flowchart of a method of controlling the gimbal by the somatosensory controller according to some embodiments of the present disclosure.

At 410, the somatosensory controller obtains angular velocity information. The angular velocity information includes an angular velocity of the somatosensory controller in a geodetic coordinate system.

In some embodiments, the somatosensory controller uses the angular velocity information to control the gimbal. The somatosensory controller may obtain the angular velocity information according to the measurement data of the sensors.

In some embodiments, the somatosensory controller can obtain angular velocity data of the somatosensory controller in a somatosensory-controller coordinate system through the IMU of the somatosensory controller. The somatosensory controller can obtain the attitude information of the somatosensory controller through the compass and the IMU of the somatosensory controller. Then, the somatosensory controller can obtain the angular velocity information according to the angular velocity data of the somatosensory controller in the somatosensory-controller coordinate system and the attitude information of the somatosensory controller.

For example, the somatosensory controller can obtain the angular velocity data, omega_body (x, y, z), of the somatosensory controller in the somatosensory-controller coordinate system through the gyroscope of the IMU of the somatosensory controller. The attitude information of the somatosensory controller may be obtained by the following method. The method includes obtaining a gravity-direction vector Vg through the accelerometer of the IMU, obtaining a geomagnetic-direction vector Vmean through the compass, performing cross product of the gravity-direction vector Vg and the geomagnetic-direction vector Vmean to obtain an east-direction vector Ve, performing cross product of the gravity-direction vector Vg and the east-direction vector Ve to obtain a north-direction vector Vn, using the gravity-direction vector Vg, the north-direction vector Vn, the east-direction vector Ve to form a reference space direction cosine matrix (DCM), DCM_ref, converting the above reference space direction cosine matrix DCM_ref into an attitude quaternion, Q_ref, integrating the angular velocity data of the gyroscope of the IMU to obtain an attitude quaternion, Q_int, and performing extended Kalman filter (EKF) fusion filtering on Q_ref and Q_int to obtain a final attitude quaternion, Q_real, of the somatosensory controller.

In the above technical solution, by performing the EKF fusion filtering to the attitude information obtained by the accelerometer and the compass and the attitude information obtained by the gyroscope, the somatosensory controller can obtain more accurate attitude information.

By using the angular velocity data omega_body (x, y, z) of the somatosensory controller in the somatosensory-controller coordinate system and the attitude information Q_real of the somatosensory controller, the somatosensory controller can obtain the angular velocity of the somatosensory in the geodetic coordinate system, that is, the angular velocity information. In some embodiments, the somatosensory controller may determine the DCM according to the attitude information of the somatosensory controller. Then, the somatosensory controller obtains the angular velocity information according to the angular velocity data of the somatosensory controller in the somatosensory-controller coordinate system and the DCM.

For example, the somatosensory controller can convert the attitude quaternion Q_real of the somatosensory controller into a Euler angle, Euler (x, y, z). The somatosensory controller sets the angle value of the Euler angle in the z-axis to 0. The somatosensory controller converts the Euler angle Euler (x, y, z) into the space direction cosine matrix DCM_trans. Then, the somatosensory controller multiplies the angular velocity data omega_body (x, y, z) by DCM_trans to obtain an angular velocity, omega_ned (x, y, z), of the somatosensory controller in the geodetic coordinate system.

In some embodiments, the somatosensory controller may calibrate the compass of the somatosensory controller.

The compass of the somatosensory controller may be interfered with by other external objects. Shifting may be effectively controlled through calibration. In some embodiments, ellipsoid calibration may be used to calibrate the compass.

At 420, the somatosensory controller transmits the angular velocity information to the gimbal.

The somatosensory controller transmits the above angular velocity information to the gimbal and controls the gimbal through the angular velocity information.

In some embodiments, a control mode of controlling the gimbal through the angular velocity information may be referred to as a velocity control mode. Correspondingly, a control mode in which the somatosensory controller transmits the attitude information to the gimbal and controls the gimbal through the attitude information may be referred to as a position control mode.

In some embodiments, the somatosensory controller may transmit a first-control-mode control signal to the gimbal. The first-control-mode control signal is used to control the gimbal to operate in the velocity control mode.

In some embodiments, the user can set the control mode at the setting panel of the somatosensory controller. When the user sets the control mode to the velocity control mode, the somatosensory controller transmits the first-control-mode control signal to the gimbal to cause the gimbal to operate in the velocity control mode. In the velocity control mode, the somatosensory controller transmits the angular velocity information to the gimbal and controls the gimbal through the angular velocity information. Correspondingly, the gimbal controls the attitude according to the angular velocity information.

At 430, the gimbal determines the target attitude of the gimbal according to the angular velocity information.

When the somatosensory controller transmits the angular velocity information to the gimbal, the gimbal determines the target attitude according to the angular velocity information. In some embodiments, the gimbal can determine a target angular velocity of the gimbal according to the angular velocity information. Then, the target angular velocity of the gimbal is integrated to obtain the target attitude of the gimbal.

In some embodiments, the somatosensory controller may also transmit control parameter information to the gimbal.

The control parameter information is used to indicate at least one of a control magnification, a smoothness, or a dead zone value.

In some embodiments, the control magnification represents a ratio of scaling the angular velocity up or down. The smoothness is used to filter the angular velocity to cause the angular velocity to change smoothly. The dead zone value represents an angular velocity value when the gimbal does not move or stops. That is, when the angular velocity transmitted by the somatosensory controller is lower than the dead zone value, the gimbal does not move or stops.

In some embodiments, the user can set the above control parameter information at the setting panel of the somatosensory controller. After the user sets the control parameter information, the somatosensory controller transmits the corresponding control parameter information to the gimbal.

When the gimbal receives the above control parameter information, the gimbal determines the target angular velocity of the gimbal according to the angular velocity information and the control parameter information. Then, the gimbal integrates the target angular velocity of the gimbal to obtain the target attitude of the gimbal.

For example, after the gimbal receives the angular velocity of the somatosensory controller in the geodetic coordinate system, the gimbal subtracts the dead zone value from the angular velocity of the somatosensory controller in the geodetic coordinate system, performs scaling up or down according to the control magnification, and performs filtering according to the smoothness, to obtain the target angular velocity of the gimbal. The result of the subtraction is also referred to as a "reduced angular velocity," which can be subjected to the scaling to obtain a scaled angular velocity, which can be subjected to the filtering to obtain a filtered angular velocity, which can be the target angular velocity of the gimbal. The gimbal integrates the target angular velocity subsequently to obtain the target attitude of the gimbal.

In the technical solution of the present disclosure, by setting the control magnification and the smoothness, the somatosensory controller can control the gimbal to have different feels and provide more choices for different users, so as to satisfy needs of various users.

At 440, the gimbal is controlled according to the target attitude of the gimbal.

After the gimbal obtains the target attitude according to the information transmitted by the somatosensory controller, the gimbal is controlled according to the target attitude.

In some embodiments, the gimbal can control the rotation axes to rotate according to the difference between the target attitude and the actual attitude of the gimbal to cause the actual attitude of the gimbal to reach the target attitude.

For example, the gimbal can determine an electric motor control signal according to the difference between the target attitude and the actual attitude. The gimbal can control the yaw axis electric motor, pitch axis electric motor, and the roll axis electric motor of the gimbal according to the electric motor control signal to effect the rotation about the yaw axis, pitch axis, and the roll axis of the gimbal. As such, the actual attitude of the gimbal approaches the target attitude.

The actual attitude of the gimbal can be determined by the measurement data of the IMU of the gimbal. For example, the angular velocity measured by the gyroscope of the gimbal may be integrated to obtain the actual attitude of the gimbal, which is not limited by embodiments of the present disclosure.

In the technical solutions of embodiments of the present disclosure, the somatosensory controller controls the gimbal through the angular velocity of the somatosensory controller in the geodetic coordinate system. The gimbal may quickly obtain the target attitude according to the angular velocity. As such, a response speed of the gimbal to the somatosensory controller may be improved, and the control efficiency of controlling the gimbal by the somatosensory controller is improved.

The velocity control mode of controlling the gimbal by the somatosensory controller is described above. In some embodiments, the position control mode may be used. The velocity control mode and the position control mode may be implemented individually or in combination. The user may set the control modes as needed at the setting panel of the somatosensory controller.

In the velocity control mode, the somatosensory controller transmits a second-control-mode control signal to the gimbal. The second-control-mode control signal is used to control the gimbal to operate in the position control mode. The somatosensory controller also transmits the attitude information of the somatosensory controller to the gimbal and controls the gimbal according to the attitude information of the somatosensory controller. Correspondingly, after the gimbal receives the attitude information of the somatosensory controller transmitted by the somatosensory controller, the gimbal determines the target attitude of the gimbal according to the attitude information of the somatosensory controller. The gimbal is controlled according to the target attitude of the gimbal.

In some embodiments, the gimbal may determine the target attitude of the gimbal according to the attitude information of the somatosensory controller and an attitude offset. The attitude offset is attitude information of the somatosensory controller received for the first time.

For example, when the gimbal receives the attitude information of the somatosensory controller for the first time, the attitude of the somatosensory controller at the moment may be set to the attitude offset (atti_offset). A subsequent target attitude (atti_target) of the gimbal is a difference between a subsequently received attitude of the somatosensory controller (atti_force) and the attitude offset (atti_offset), that is, atti_force−atti_offset.

The method of controlling the gimbal by the somatosensory controller of embodiments of the present disclosure is described in detail above. The gimbal, the somatosensory controller, and the system of embodiments of the present disclosure are described below. The gimbal, the somatosensory controller, and the system of embodiments of the present disclosure can execute various methods of the above embodiments of the present disclosure. That is, specific operation processes of various products may be referred to as the corresponding processes of the above method embodiments, which are not repeated for brevity.

Figure 5:
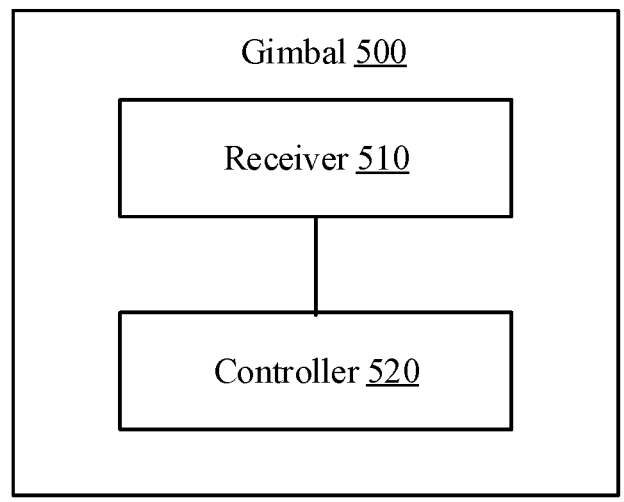
FIG. 5 illustrates a schematic block diagram of a gimbal according to some embodiments of the present disclosure.

FIG. 5 illustrates a schematic block diagram of a gimbal 500 according to some embodiments of the present disclosure.

The gimbal 500 in FIG. 5 uses the structure of the gimbal in FIG. 2 or another structure, which is not limited by embodiments of the present disclosure.

As shown in FIG. 5, the gimbal 500 includes a receiver 510 and a controller 520. The receiver 510 is configured to receive the angular velocity information transmitted by the somatosensory controller. The angular velocity information includes the angular velocity of the somatosensory controller in the geodetic coordinate system. The controller 520 is configured to determine the target attitude of the gimbal according to the angular velocity information. The controller 520 controls the gimbal according to the target attitude of the gimbal.

In some embodiments, the receiver 510 is further configured to receive the first-control-mode control signal transmitted by the somatosensory controller. The first-control-mode control signal is used to control the gimbal to operate in the velocity control mode.

In some embodiments, the controller 520 is further configured to determine the target angular velocity of the gimbal according to the angular velocity information, and integrate the target angular velocity of the gimbal to obtain the target attitude of the gimbal.

In some embodiments, the receiver 510 is further configured to receive the control parameter information transmitted by the somatosensory controller. The control parameter information is used to indicate at least one of the control magnification, the smoothness, or the dead zone value.

In some embodiments, the controller 520 is further configured to determine the target angular velocity of the gimbal according to the angular velocity information and the control parameter information, and integrate the target angular velocity of the gimbal to obtain the target attitude of the gimbal.

In some embodiments, the controller 520 is configured to subtract the dead zone value from the angular velocity of the somatosensory controller in the geodetic coordinate system, perform scaling up or down according to the control magnification, and perform filtering according to the smoothness to obtain the target angular velocity of the gimbal.

In some embodiments, the receiver 510 is further configured to receive the second-control-mode control signal transmitted by the somatosensory controller, and receive the attitude information of the somatosensory controller transmitted by the somatosensory controller. The second-control-mode control signal is used to control the gimbal to operate in the position control mode.

The controller 520 is configured to determine the target attitude of the gimbal according to the attitude information of the somatosensory controller, and control the gimbal according to the target attitude of the gimbal.

In some embodiments, the controller 520 is configured to determine the target attitude according to the attitude information of the somatosensory controller and attitude offset. The attitude offset is the attitude information of the somatosensory controller received for the first time.

The gimbal 500 may further include components generally included in a gimbal. For example, the rotation axis mechanism, etc., which are not limited by embodiments of the present disclosure.

Figure 6:
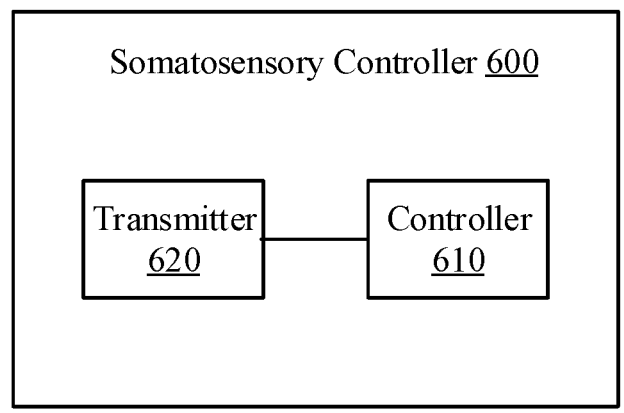
FIG. 6 illustrates a schematic block diagram of a somatosensory controller according to some embodiments of the present disclosure.

FIG. 6 illustrates a schematic block diagram of a somatosensory controller 600 according to some embodiments of the present disclosure.

As shown in FIG. 6, the somatosensory controller 600 includes a controller 610 and a transmitter 620. The controller 610 is configured to obtain the angular velocity information. The angular velocity information includes the angular velocity of the somatosensory controller in the geodetic coordinate system. The transmitter 620 is configured to transmit the angular velocity information to the gimbal. The angular velocity information is used to control the gimbal.

Figure 7:
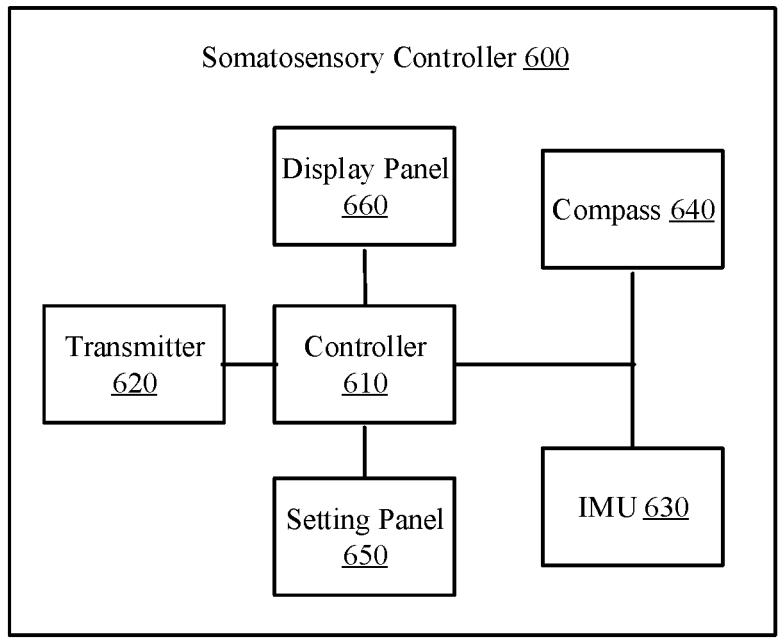
FIG. 7 illustrates a schematic block diagram of another somatosensory controller according to some embodiments of the present disclosure.

In some embodiments, as shown in FIG. 7, the somatosensory controller 600 further includes an inertial measurement unit (IMU) 630 and a compass 640.

The controller 610 is configured to obtain the angular velocity data of the somatosensory controller in the somatosensory-controller coordinate system through the IMU 630, obtain the attitude information of the somatosensory controller through the compass 640 and the IMU 630, and obtain the angular velocity information according to the angular velocity data of the somatosensory controller in the somatosensory-controller coordinate system and the attitude information of the somatosensory controller.

In some embodiments, the controller 610 is configured to determine the space direction cosine matrix (DCM) according to the attitude information of the somatosensory controller, and obtain the angular velocity information according to the angular velocity data of the somatosensory controller in the somatosensory-controller coordinate system and the DCM.

In some embodiments, the controller 610 is further configured to calibrate the compass.

In some embodiments, the transmitter 620 is further configured to transmit the first-control-mode control signal to the gimbal. The first-control-mode control signal is used to control the gimbal to operate in the velocity control mode.

In some embodiments, the transmitter 620 is configured to transmit the control parameter information to the gimbal. The control parameter information is used to indicate at least one of the control magnification, the smoothness, or the dead zone value.

In some embodiments, the transmitter 620 is further configured to transmit the second-control-mode control signal to the gimbal and transmit the attitude information of the somatosensory controller to the gimbal. The second-control-mode control signal is used to control the gimbal to operate in the position control mode. The attitude information of the somatosensory controller is used to control the gimbal.

In some embodiments, as shown in FIG. 7, the somatosensory controller 600 further includes a setting panel 650. The setting panel 650 is configured for the user to set at least one of the control magnification, the smoothness, the dead zone value, the control mode, start, stop, or end to control the gimbal.

The setting panel 650 is configured for the user to enter the corresponding settings, which may be implemented in various manners and are not limited by embodiments of the present disclosure.

For example, the control magnification may be set through a knob. The control magnifications of the different axes may be set through different knobs. That is, the control magnifications of the different axes may be the same or different. The smoothness and the dead zone value may also be set through knobs. The control mode may be set through a button. That is, the user may set the somatosensory controller to control the gimbal to operate in the velocity control mode or the position control mode through the button. The start, stop, and end for controlling the gimbal may also be set through a button.

In some embodiments, as shown in FIG. 7, the somatosensory controller 600 further includes a display panel 660. The display panel 660 is configured to display the information of the somatosensory controller and/or the gimbal for the user.

Embodiments of the present disclosure do not limit specific implementations of the above controller 520 and the controller 610. The controller 520 and the controller 610 may also include processors, chips, mainboards, etc., which are not limited by embodiments of the present disclosure.

Figure 8:
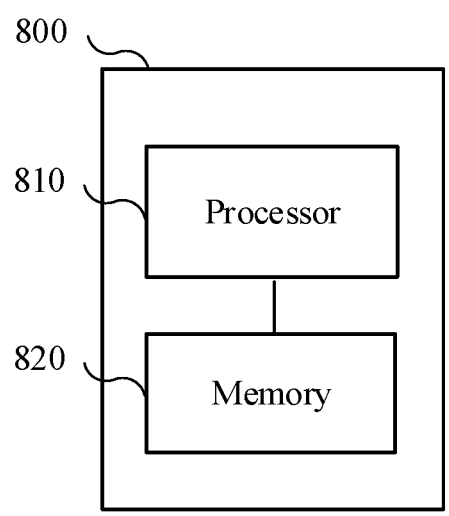
FIG. 8 illustrates a schematic block diagram of a computer system according to some embodiments of the present disclosure.

FIG. 8 illustrates a schematic block diagram of a computer system 800 according to some embodiments of the present disclosure.

As shown in FIG. 8, the computer system 800 includes a processor 810 and a memory 820.

The computer system 800 may also include other components generally included in other computer systems, for example, a communication interface, etc., which are not limited by embodiments of the present disclosure.

The memory 820 is configured to store computer-executable instructions.

The memory 820 may be various memories, for example, may include high-speed random access memory (RAM), or may also include non-volatile memory, such as at least one magnetic disk memory, which is not limited by embodiments of the present disclosure.

The processor 810 is configured to visit the memory 820 and execute the computer-executable instructions to perform operations of the method of embodiments of the present disclosure.

The processor 810 may include a microprocessor, a field-programmable gate array (FPGA), a central processing unit (CPU), a graphics processing unit (GPU), etc., which is not limited by embodiments of the present disclosure.

In some embodiments, the gimbal may include a computer system 800. The computer system 800 can perform the operations of the methods of the above embodiments of the present disclosure. In some embodiments, the somatosensory controller may include the computer system 800 to perform operations of the somatosensory controller of the methods of the above embodiments of the present disclosure.

Embodiments of the present disclosure also provide a system. The system may include the gimbal and the somatosensory controller of the above embodiments of the present disclosure.

Embodiments of the present disclosure further provide a computer storage medium. The computer storage medium stores program codes. The program codes may be used to execute the methods of the above embodiments of the present disclosure.

In embodiments of the present disclosure, the term "and/or" is merely an association relationship describing associated objects, and indicates that three kinds of relationships may exist. For example, A and/or B may indicate three situations: A exists alone, A and B both exist, and B exists alone. In addition, the symbol "/" in this disclosure generally indicates that the associated objects have an "or" relationship.

Those of ordinary skill in the art may realize that the units and algorithm processes of the examples described in connection with embodiments disclosed in the present disclosure can be implemented by electronic hardware, computer software, or a combination thereof. To describe interchangeability of the hardware and the software, in the above description, the composition and processes of each example have been described generally in terms of function. Whether these functions are executed in hardware or software depends on the specific application of the technical solution and design constraints. Those skilled in the art can use different methods to implement the described functions for each specific application, but such implementation should not be considered beyond the scope of the present disclosure.

Those skilled in the art can clearly understand that, for convenience and brevity of the description, the specific operation processes of the above-described system, device, and unit can refer to the corresponding processes in the above method embodiments, which are not repeated here.

In some embodiments of the present disclosure, the disclosed system, device, and method may be implemented in other manners. For example, the above device embodiments are only schematic. For example, the division of the units is only a division of logical functions. In actual implementation, other divisions may exist, for example, multiple units or components may be combined or integrated into another system, or some features may be ignored, or not implemented. In addition, the displayed or discussed mutual couplings or direct couplings or communication connections may be indirect couplings or communication connections through some interfaces, devices, or units, and may also be electrical, mechanical, or other forms of connections.

The units described as separate components may or may not be physically separated, and the component displayed as a unit may or may not be a physical unit. The units may be located in one place or may be distributed to multiple network units. Some or all of the units can be selected according to actual needs to achieve the objectives of the solutions of embodiments of the present disclosure.

In addition, the functional units in embodiments of the present disclosure may be integrated into one processing unit, or each unit may exist alone physically, or two or more units may be integrated into one unit. The above-integrated unit may be implemented in the form of a hardware or software functional unit.

If the integrated unit is implemented in the form of a software functional unit and sold or used as an independent product, the integrated unit may be stored in a computer-readable storage medium. Based on this understanding, all or part of the technical solutions can be embodied in form of a software product. The computer software product is stored in a storage medium. The computer software product includes several instructions, which are used to cause a computer device (may be a personal computer, server, network device, etc.) to perform all or part of the processes of the methods described in various embodiments of the present disclosure. The above storage medium includes various media that can store program codes, such as flash drive, mobile hard drive, read-only memory (ROM), random access memory (RAM), magnetic disk, optical disk, etc.

Only specific embodiments of the present disclosure are described above. However, the scope of the present disclosure is not limited here. Any person skilled in the art in the technical field disclosed in the present disclosure can easily think of various equivalent modifications or replacements. These modifications or replacements should be within the scope of the present disclosure. Therefore, the scope of the invention should be subject to the scope of the claims.

What is claimed is:

1. A method of controlling a gimbal comprising:
   obtaining angular velocity information of a somatosensory controller;
   obtaining control parameter information, the control parameter information indicating at least one of a control magnification, a smoothness, or a dead zone value;
   determining a target attitude of the gimbal according to the angular velocity information and the control parameter information; and
   controlling the gimbal according to the target attitude.

2. The method of claim 1, further comprising, before obtaining the angular velocity information:
   receiving a mode control signal transmitted by the somatosensory controller, the mode control signal controlling the gimbal to operate in a velocity control mode.

3. The method of claim 1, wherein determining the target attitude of the gimbal includes:
   determining a target angular velocity of the gimbal according to the angular velocity information; and
   integrating the target angular velocity of the gimbal to obtain the target attitude of the gimbal.

4. The method of claim 1, wherein determining the target attitude of the gimbal includes:
   determining a target angular velocity of the gimbal according to the angular velocity information and the control parameter information; and
   integrating the target angular velocity of the gimbal to obtain the target attitude of the gimbal.

5. The method of claim 4, wherein determining the target angular velocity of the gimbal includes:
   subtracting the dead zone value from the angular velocity of the somatosensory controller in the geodetic coordinate system to obtain a reduced angular velocity;
   scaling the reduced angular velocity up or down according to the control magnification to obtain a scaled angular velocity; and
   filtering the scaled angular velocity according to the smoothness to obtain the target angular velocity of the gimbal.

6. The method of claim 1, further comprising:
   receiving a mode control signal transmitted by the somatosensory controller, the mode control signal controlling the gimbal to operate in a position control mode;
   receiving attitude information of the somatosensory controller transmitted by the somatosensory controller; and
   determining the target attitude of the gimbal according to the attitude information of the somatosensory controller.

7. The method of claim 6, wherein determining the target attitude of the gimbal according to the attitude information of the somatosensory controller includes determining the target attitude of the gimbal according to the attitude information of the somatosensory controller and an attitude offset.

8. The method of claim 7, wherein the attitude offset is attitude information of the somatosensory controller received for a first time.

9. The method of claim 1, wherein the angular velocity information is transmitted by the somatosensory controller, the angular velocity information including an angular velocity of the somatosensory controller in a geodetic coordinate system.

10. The method of claim 1, wherein the control parameter information is transmitted by the somatosensory controller.

11. A method of controlling a gimbal comprising:
    obtaining angular velocity information of a somatosensory controller;
    obtaining control parameter information, the control parameter information indicating at least one of a control magnification, a smoothness, or a dead zone value; and
    transmitting the angular velocity information and the control parameter information to the gimbal for controlling the gimbal according to the angular velocity information and the control parameter information.

12. The method of claim 11, wherein obtaining angular velocity information includes:
    obtaining angular velocity data of the somatosensory controller in a somatosensory-controller coordinate system through an inertial measurement unit (IMU) of the somatosensory controller;
    obtaining attitude information of the somatosensory controller through a compass and the IMU of the somatosensory controller; and
    obtaining the angular velocity information according to the angular velocity data and the attitude information.

13. The method of claim 12, wherein obtaining the angular velocity information according to the angular velocity data and the attitude information includes:

determining a space direction cosine matrix (DCM) according to the attitude information; and obtaining the angular velocity information according to the angular velocity data and the DCM.

14. The method of claim 12, further comprising:
calibrating the compass.

15. The method of claim 11, further comprising, before transmitting the angular velocity information to the gimbal:

transmitting a mode control signal to the gimbal, the mode control signal controlling the gimbal to operate in a velocity control mode.

16. The method of claim 11, further comprising:

transmitting a mode control signal to the gimbal, the mode control signal controlling the gimbal to operate in a position control mode; and transmitting attitude information of the somatosensory controller to the gimbal for controlling the gimbal according to the attitude information.

17. The method of claim 11, wherein the angular velocity information is transmitted by the somatosensory controller, the angular velocity information including an angular velocity of the somatosensory controller in a geodetic coordinate system.

18. The method of claim 11, wherein the control parameter information is transmitted by the somatosensory controller.

* * * * *